(12) United States Patent
Kang et al.

(10) Patent No.: US 11,381,871 B2
(45) Date of Patent: Jul. 5, 2022

(54) ELECTRONIC APPARATUS AND CONTROLLING METHOD THEREOF

(71) Applicant: Samsung Electronics Co., Ltd., Suwon-si (KR)

(72) Inventors: Youngsoo Kang, Suwon-si (KR); Yeonjoon Kim, Suwon-si (KR); Jaejoong Byun, Suwon-si (KR); Yujin Lee, Suwon-si (LR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/710,881

(22) Filed: Dec. 11, 2019

(65) Prior Publication Data

US 2020/0186871 A1 Jun. 11, 2020

(30) Foreign Application Priority Data

Dec. 11, 2018 (KR) .......................... 10-2018-0158837

(51) Int. Cl.
*H04N 21/438* (2011.01)
*H04N 21/4363* (2011.01)
(Continued)

(52) U.S. Cl.
CPC ....... *H04N 21/4383* (2013.01); *H04N 21/434* (2013.01); *H04N 21/4363* (2013.01); *H04N 21/4402* (2013.01); *H04N 21/64322* (2013.01)

(58) Field of Classification Search
None
See application file for complete search history.

(56) References Cited

U.S. PATENT DOCUMENTS 8,010,692 B1 * 8/2011 Shanson .......... H04N 21/42607
709/231
8,667,537 B2 3/2014 Shimizu et al.
(Continued)

FOREIGN PATENT DOCUMENTS

CN 104602115 A 5/2015
CN 106534961 A 3/2017
(Continued)

OTHER PUBLICATIONS

International Search Report and Written Opinion of the International Searching Authority dated Mar. 26, 2020 in International Patent Application No. PCT/KR2019/017472.

*Primary Examiner* — Ricky Chin
(74) *Attorney, Agent, or Firm* — Staas & Halsey LLP

(57) ABSTRACT

An electronic apparatus includes a communicator connected to a Local Area Network (LAN), an inputter, a memory storing at least one computer executable instruction, and a processor. The processor outputs a content of a first channel received through the communicator, receives information associated with contents of a plurality of channels through the communicator and stores the information in the memory while the content of the first channel is being output, and based on an instruction change the first channel to a second channel while the content of the first channel is output, acquires information associated with the content of the second channel among the stored information associated with the contents of the plurality of channels from the memory, and decodes the content of the second channel received through the communicator by using the acquired information on the content of the second channel and outputs the decoded content.

9 Claims, 9 Drawing Sheets

(51) Int. Cl.
*H04N 21/434* (2011.01)
*H04N 21/4402* (2011.01)
*H04N 21/643* (2011.01)

(56) References Cited

U.S. PATENT DOCUMENTS

| | | | | |
|---|---|---|---|---|
| 8,856,282 B2* | 10/2014 | Kim | ................ | H04N 21/251 |
| | | | | 709/219 |
| 8,934,533 B2* | 1/2015 | Millar | ................ | H04N 21/6587 |
| | | | | 375/240.01 |
| 10,097,883 B1* | 10/2018 | Rasool | ................ | H04N 21/2387 |
| 2004/0111741 A1* | 6/2004 | DePietro | ............ | H04N 21/4668 |
| | | | | 348/E5.097 |
| 2007/0230956 A1* | 10/2007 | Ikeda | ................ | H04J 3/1694 |
| | | | | 398/71 |
| 2008/0301745 A1* | 12/2008 | Liu | ................ | H04N 21/23106 |
| | | | | 725/110 |
| 2009/0198656 A1* | 8/2009 | Lee | ................ | H04N 21/64322 |
| | | | | 707/999.102 |
| 2009/0222874 A1 | 9/2009 | White et al. | | |
| 2009/0279431 A1* | 11/2009 | Baruah | ................ | H04L 65/80 |
| | | | | 370/235 |
| 2010/0064316 A1* | 3/2010 | Dai | ................ | H04N 21/23439 |
| | | | | 725/38 |
| 2010/0070645 A1* | 3/2010 | Liu | ................ | H04N 21/44004 |
| | | | | 709/234 |
| 2010/0229211 A1* | 9/2010 | Lee | ................ | H04N 21/6405 |
| | | | | 725/109 |
| 2010/0325672 A1* | 12/2010 | Barnett, Jr. | ............ | H04N 21/21 |
| | | | | 725/81 |
| 2011/0099577 A1* | 4/2011 | Campana | ................ | H04N 21/4351 |
| | | | | 725/39 |
| 2011/0173670 A1 | 7/2011 | Song et al. | | |
| 2011/0280241 A1* | 11/2011 | Field | ................ | H04N 21/6405 |
| | | | | 370/390 |
| 2012/0008053 A1* | 1/2012 | Fisher | ................ | H04N 21/4384 |
| | | | | 348/731 |
| 2012/0131627 A1* | 5/2012 | Chittella | ............ | H04N 21/4621 |
| | | | | 725/109 |
| 2013/0007226 A1* | 1/2013 | White | ................ | H04N 21/4383 |
| | | | | 709/219 |
| 2013/0219423 A1* | 8/2013 | Prickett | ................ | H04N 21/4383 |
| | | | | 725/32 |
| 2013/0229575 A1* | 9/2013 | Lin | ................ | H04N 5/50 |
| | | | | 348/515 |
| 2013/0231043 A1 | 9/2013 | Tawfiq Moshtaha et al. | | |
| 2014/0013356 A1* | 1/2014 | Chen | ................ | H04N 21/482 |
| | | | | 725/40 |
| 2014/0189736 A1* | 7/2014 | Kummer | ................ | H04N 5/50 |
| | | | | 725/39 |
| 2015/0052569 A1 | 2/2015 | Surya et al. | | |
| 2015/0085196 A1* | 3/2015 | Wang | ................ | H04N 21/4347 |
| | | | | 348/731 |
| 2015/0288733 A1* | 10/2015 | Mao | ................ | H04L 65/602 |
| | | | | 709/219 |
| 2016/0173938 A1 | 6/2016 | Jabara et al. | | |
| 2016/0380919 A1* | 12/2016 | Wang | ................ | H04L 65/4076 |
| | | | | 370/312 |
| 2017/0070757 A1* | 3/2017 | Phillips | ............ | H04N 21/64738 |
| 2017/0070758 A1* | 3/2017 | Phillips | ............ | H04N 21/64769 |
| 2017/0134798 A1* | 5/2017 | Seo | ................ | H04N 21/433 |
| 2017/0171618 A1* | 6/2017 | Fryer | ................ | H04N 21/41407 |

FOREIGN PATENT DOCUMENTS

| | | |
|---|---|---|
| KR | 10-0910586 A | 8/2009 |
| KR | 10-2011-0049339 | 5/2011 |
| KR | 10-1231694 | 2/2013 |
| KR | 10-1400309 | 5/2014 |
| KR | 10-1643848 | 7/2016 |
| KR | 10-2017-0053004 | 5/2017 |

* cited by examiner

ELECTRONIC APPARATUS AND CONTROLLING METHOD THEREOF

CROSS-REFERENCE TO RELATED APPLICATION(S)

This application is based on and claims priority under 35 U.S.C. § 119(a) of a Korean patent application number 10-2018-0158837, filed on Dec. 11, 2018 in the Korean Intellectual Property Office, the disclosure of which is incorporated by reference herein in its entirety.

BACKGROUND

1. Field

The disclosure relates to an electronic apparatus and a controlling method thereof, and more particularly, to an electronic apparatus which can enhance the speed of channel conversion at an Internet Protocol TV (IPTV) and a controlling method thereof.

2. Description of Related Art

An Internet Protocol TV (IPTV) refers to a convergence service of communication and broadcasting of watching TV by an Internet Protocol method. In such a service, real-time streaming broadcasting contents, Video On-demands (VODs), and Interactive TV (iTV) may be included, for example.

For a real-time streaming broadcasting content provided through a conventional analog broadcasting network, the channel can be converted swiftly simply through change of the frequency (the channel), and thus the speed of channel conversion is fast. In contrast, in the case of a real-time streaming broadcasting content provided through an IPTV network, several seconds are spent for receiving and processing the content of the corresponding channel at the time of channel conversion, and thus there is a problem that the speed of channel conversion is reduced.

SUMMARY

An electronic apparatus according to an embodiment of the disclosure includes a communicator connected to a Local Area Network (LAN), an inputter, a memory storing at least one computer executable instruction, and a processor executing the at least one computer executable instruction. The processor outputs a content of a first channel received through the communicator, receives information on contents of a plurality of channels through the communicator and stores the information in the memory while outputting the content of the first channel, and based on an instruction to change the channel to a second channel being input through the inputter while outputting the content of the first channel, acquires information on the content of the second channel among the stored information on the contents of the plurality of channels from the memory, and decodes the content of the second channel received through the communicator by using the acquired information on the content of the second channel and outputs the content.

A controlling method of an electronic apparatus according to an embodiment of the disclosure includes the steps of outputting a content of a first channel received through the communicator of the electronic apparatus connected to a Local Area Network (LAN), receiving information on contents of a plurality of channels through the communicator and storing the information while outputting the content of the first channel, and based on an instruction to change the channel to a second channel being input while outputting the content of the first channel, acquiring information on the content of the second channel among the stored information on the contents of the plurality of channels, and decoding the content of the second channel received through the communicator by using the acquired information on the content of the second channel and outputting the content.

BRIEF DESCRIPTION OF THE DRAWINGS

Aspects, features, and advantages of certain embodiments of the present disclosure will be more apparent from the following description taken in conjunction with the accompanying drawings, in which.

DETAILED DESCRIPTION

Figure 1:
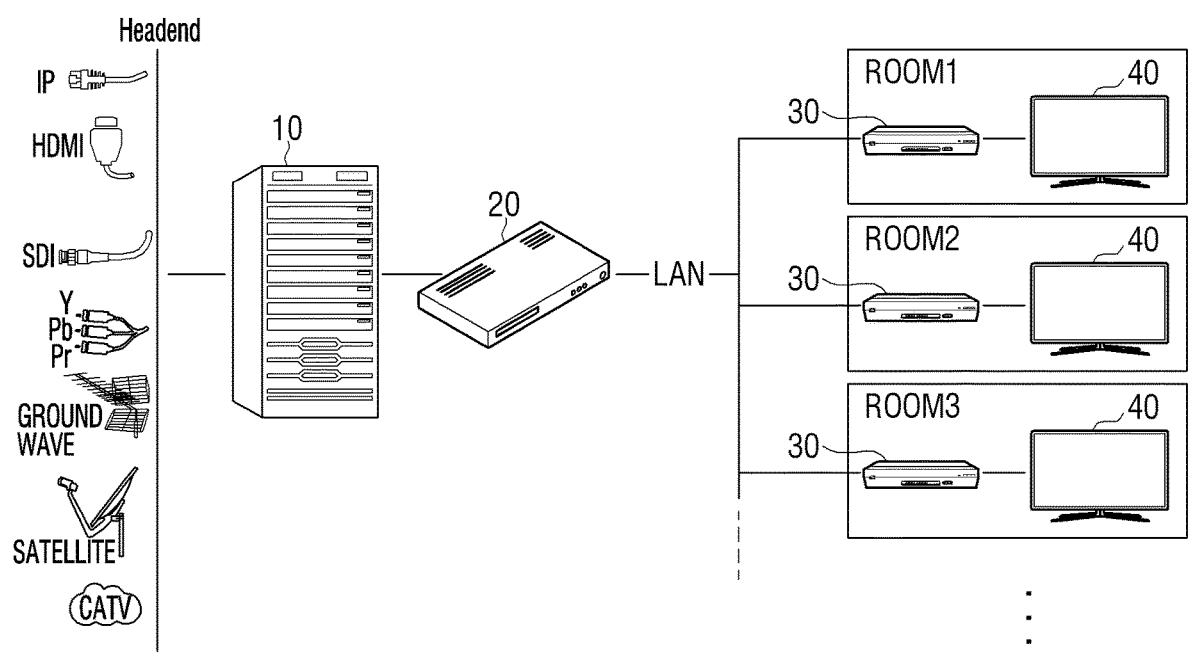
FIG. 1 is a diagram for illustrating an IPTV system according to an embodiment of the disclosure.

The disclosure was devised according to the aforementioned need, and the purpose of the disclosure is in providing an electronic apparatus which can figure out information on a content that is being streamed in an IPTV environment in advance and can enhance the speed of channel conversion, and a controlling method thereof.

Hereinafter, various embodiments of the disclosure will be described. Meanwhile, it should be noted that the various embodiments are not for limiting the technology of the disclosure to a specific embodiment, but they should be interpreted to include various modifications, equivalents and/or alternatives of the embodiments described in the disclosure.

In the disclosure, expressions such as "have," "may have," "include" and "may include" should be construed as denoting that there are such characteristics (e.g.: elements such as numerical values, functions, operations and components), and the expressions are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" refer to all of the following cases: (1) including at least one A, (2) including at least one B, or (3) including at least one A and at least one B.

Further, the expressions "first," "second" and the like used in the disclosure may be used to describe various elements regardless of any order and/or degree of importance. Also, such expressions are used only to distinguish one element from another element, and are not intended to limit the elements. For example, a first user device and a second user device may refer to user devices that are different from each other, regardless of any order or degree of importance. Also, for example, a first element may be called a second element, and a second element may be called a first element in a similar manner, without departing from the scope of the disclosure.

Meanwhile, the terms "a module," "a unit," "a part" and the like used in the disclosure are for referring to elements performing at least one function or operation, and these elements may be implemented as hardware or software, or as a combination of hardware and software. Further, a plurality of "modules," "units," "parts" and the like may be integrated into at least one module or chip and implemented as at least one processor, except when each of them has to be implemented as individual, specific hardware.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

Further, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Meanwhile, the terms used in the disclosure are just used to explain specific embodiments of the disclosure, and are not intended to limit the scope of the other embodiments. Also, singular expressions may include plural expressions, unless defined obviously differently in the context. The terms used in the disclosure, including technical or scientific terms, may have meanings identical to those generally understood by those of ordinary skill in the art described in the disclosure. Terms defined in general dictionaries among the terms used herein may be interpreted to have the same meaning as or a similar meaning to the contextual meaning in the related art. Unless otherwise defined, the terms used herein may not be interpreted to have an ideal or overly formal meaning. In some cases, even terms defined herein may not be interpreted to exclude the embodiments herein.

Hereinafter, the disclosure will be described in more detail with reference to the accompanying drawings. Meanwhile, in explaining the disclosure, in case it is determined that detailed explanation of related known functions or features may unnecessarily confuse the gist of the disclosure, the detailed explanation will be omitted. Also, with respect to the detailed description of the drawings, similar components may be designated by similar reference numerals.

In the disclosure, the term "a network element" may refer to a network computer, networking hardware, network equipment, a router, a switch, a hub, a bridge, a wireless network controller, a wireless access network device, a gateway, a server, or a device similar thereto. Also, a network element may mean a physical computing device in a wired or wireless communication network, and may be implemented to host a virtual machine. In addition, a network element may mean equipment that provides a wireless base band function for data connection between a network and a user. Further, a network element may be referred to as a base station. In the disclosure, the term "a base station" may refer to a node B, an improved or evolved node B, a base transceiver station (BTS), an access point (AP), or a device similar thereto.

FIG. 1 is a diagram for illustrating an IPTV system 1000 according to an embodiment of the disclosure.

The IPTV system 1000 may provide a content by using an Internet Protocol. In the disclosure, a content indicates an audio content, a moving image content, a still image content, or a combination thereof. Also, in the disclosure, a content means a content that is being streamed in an IPTV environment.

Referring to FIG. 1, the IPTV system 1000 may include a first network element 10, a second network element 20, and a receiving device 30.

The first network element 10 may receive contents from various sources. For example, as illustrated in FIG. 1, the first network element 10 may receive various contents from at least one of the Internet (IP), a high definition multimedia interface (HDMI), a serial digital interface (SDI), YPbPr, a terrestrial TV (ground wave), a satellite TV, or a cable TV.

The second network element 20 may provide contents received from the first network element 10 to receiving devices 30. According to an embodiment of the disclosure, the second network element 20 may be connected with the receiving devices 30 through a Local Area Network (LAN). A LAN is a network which provides high speed communication for connecting several devices in limited areas such as houses, offices, hotels, buildings, and factories.

According to an embodiment of the disclosure, the second network element 20 may transmit contents to the receiving devices 30 by using a User Datagram Protocol (UDP). In this case, contents may be transmitted through a multicast method and a unicast method. According to an embodiment of the disclosure, contents may be transmitted in the form of a packet based on MPEG-2 TS.

The first network element 10 and the second network element 20 may be implemented as one device.

The receiving devices 30 (hereinafter, collectively referred to as the receiving device 30) may receive contents transmitted from the second network element 20, and output the received contents. According to an embodiment of the disclosure, the receiving device 30 may be connected with a display device 40 that can output audio and/or images, and output contents to an external device.

The receiving device 30 may refer to a client, a mobile device, a user terminal, user equipment (UE), a subscriber, a user, a remote station, an access agent, a user agent, etc., and it may also refer to a remote user of network resources in a communication network.

According to an embodiment of the disclosure, the receiving device 30 may be implemented as a device that receives a content and outputs the content to a display device 40 such as a TV, like a set top box, an Over The Top (OTT) device, etc. For example, the receiving device 30 may be connected with the display device 40 via HDMI and output a content to the display device 40.

According to another embodiment of the disclosure, the receiving device 30 and the display device 40 may be implemented as one device. For example, they may be implemented as a TV having a set top housed therein, wherein the receiving device 30 and the display device 40 are combined.

The receiving device 30 may acquire information on a content in advance and utilize the information at the time point when the content is reproduced, for improving the conversion performance of IPTV channels. Here, information on a content is information necessary for reproducing a content, and it may be, for example, information necessary for decoding, etc. If information on a content acquired in advance is utilized, in the case of a Transport Stream (TS), improvement of the channel conversion performance of about 1 second at the maximum can be obtained depending on contents (the standard of performance is a time point of outputting a screen).

There are two kinds of methods for acquiring information on a content in advance, in general, and the first one is receiving data in a predetermined form from an application or a server, and the second one is storing information figured out in the previous reproduction internally and utilizing the information. In the case of the first method, a protocol should be agreed upon in advance with an application/server side, and thus there is restriction on universality. In this case, it is relatively easy to make agreement when interlocking with a specific business operator/application, but continuous maintenance is needed, and it is difficult to apply a new technology. For information necessary for improving the channel conversion performance, different methods may be applied for each year, or for each hardware, and if these methods are transmitted by a protocol, an issue of maintenance may occur. Also, in the case of a product which is targeted to several unspecified business operators (ex. hotel TVs, signage), it is very difficult to proceed and maintain such pre-agreement. Meanwhile, in the case of the second method, there is restriction that improvement of the channel conversion performance can be applied only after reaching the channel at least once. Accordingly, in case conversion is made among various channels, or in case contents of one channel keeps changing, the usability of the method may be deteriorated.

Accordingly, the receiving device 30 according to the embodiments of the disclosure may acquire information on a content that is being streamed in a multicast/unicast environment in advance, and utilize the information at the time point of reproduction, and thereby enhance the speed of channel conversion. Specifically, the receiving device 30 may continuously figure out through which IP:Port a content is being serviced to the current IP environment in the background, and analyze the content being serviced and acquire information for improvement of the channel conversion performance, and use the information stored in advance when moving to the actual channel, and thereby improve the speed of channel conversion.

Figure 2:
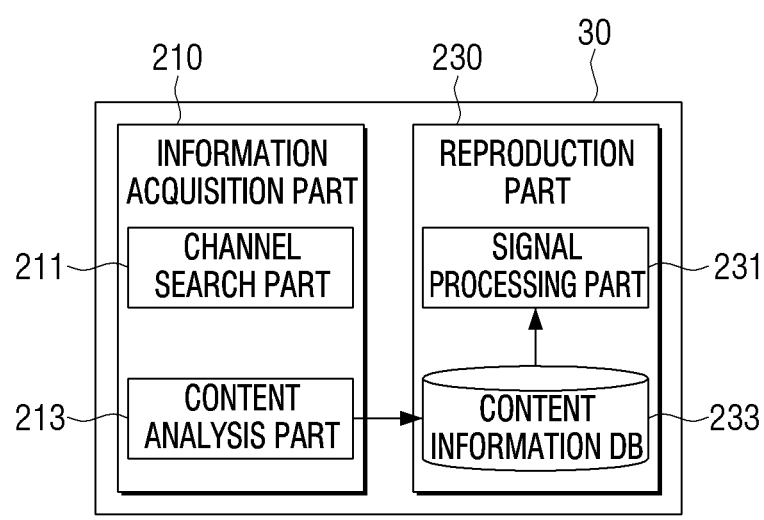
FIG. 2 is a diagram for illustrating a configuration of a receiving device according to an embodiment of the disclosure.

FIG. 2 is a diagram for illustrating the configuration of the receiving device 30 according to an embodiment of the disclosure. Referring to FIG. 2, the receiving device 30 may include an information acquisition part 210 and a reproduction part 230.

The information acquisition part 210 may include a channel search part 211 and a content analysis part 213.

The channel search part 211 may scan IPTV addresses by utilizing information on IP:PORTs through which contents are being serviced in the current network. Specifically, the channel search part 211 may continuously figure out whether data is being actually received in the background while searching a UDP socket. As the band of a UDP multicast address is set, the channel search part 211 may figure out IP:PORTs through which data is received in the band of the address or a range which is a little broader than that, and make a list.

The content analysis part 213 needs to identify which content the data received through the UDP is. Also, in case the data is determined to be a content, the content analysis part 213 may analyze the content and acquire information on the content. Here, information on the content is information necessary for reproducing the content, and it may be, for example, information necessary for signal processing that needs be performed before reproduction of the content such as decoding. As a specific example, information on a content may include information on the format (ex. TS, MP4, MPV, and MOV) of the content, information on the configuration of the program (Program Specific Information, PSI), frame rate information, resolution information, etc. As contents may be in various formats, the content analysis part 213 may identify what kind of content a content is, and extract information necessary for the type of each content. Also, the content analysis part 213 may store the acquired information on contents in a content information database 233 for each IP:PORT.

The information acquisition part 210 may collect/update information in real time in the background with respect to the entire channels regardless of the channel that is currently being viewed.

The reproduction part 230 may include a signal processing part 231 and a content information database 233.

As the conventional role of the reproduction part 230, when an instruction to change a channel is input, the reproduction part 230 1) analyzed the content of the channel, and 2) performed signal processing based on information on the content necessary for reproducing the content and thereby performed a reproducing operation. The role of the reproduction part 230 goes through the two steps as above in general, and in case information on a content acquired in advance at the information acquisition part 210 is in the content information database 233 as described above, the reproduction part 230 may 1) omit the step of analyzing the content, and 2) perform signal processing immediately and thereby perform a reproducing operation.

Specifically, when an instruction to change a channel is input, the signal processing part 231 may perform various types of signal processing for reproducing the content of the channel, and may call information necessary for the signal processing from the content information database 233. Meanwhile, signal processing may include decoding, scaling, and frame rate conversion processes.

Figure 4:
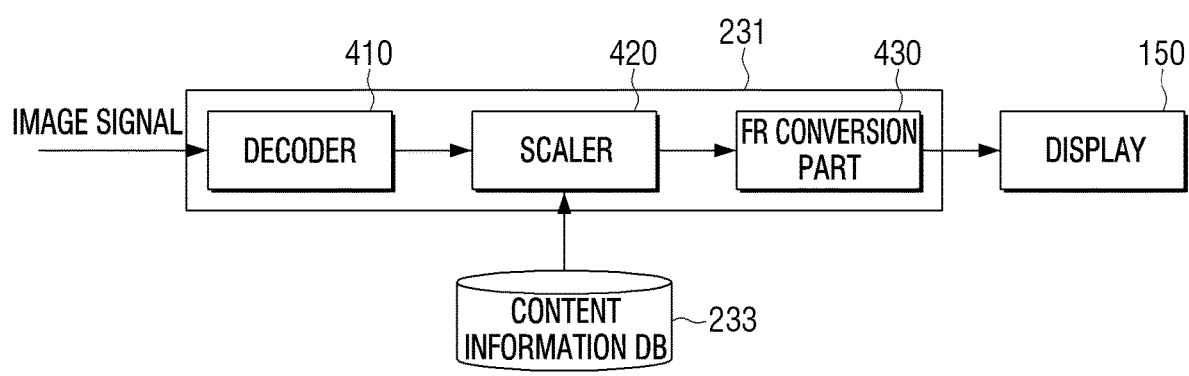
FIG. 4 is a diagram for illustrating a configuration of a signal processing part according to an embodiment of the disclosure.

FIG. 4 is a diagram for illustrating the configuration of the signal processing part 231 according to an embodiment of the disclosure.

Referring to FIG. 4, the signal processing part 231 may include a decoder 410, a scaler 420, and a frame rate (FR) conversion part 430.

When an instruction to change a channel is input, the decoder 410 may decode the image signal of the channel to be changed. Content information on the image signal of the channel to be changed is stored in the content information database 233 in advance by the information acquisition part 210. Thus, the decoder 410 may acquire such content information stored in advance from the content information database 233, and decode the image signal of the channel to be changed. For example, the decoder 410 may identify the encoding format included in the acquired content information, and perform decoding for the image signal of the channel to be changed by a method corresponding to the identified encoding format.

The scaler 420 cannot manufacture all images that suit each resolution in general, and accordingly, images are manufactured in specific sizes. Thus, the size of an image can be changed to suit the resolution of the display 150. Specifically, the scaler 420 may identify which resolution a decoded image signal has from the information on the content acquired from the content information database 233, and in case the identified resolution and the resolution of the display 150 are different, the scaler 420 may scale the identified resolution to suit the resolution of the display 150.

The frame rate conversion part 430 may convert the frame rate of an image to suit the frame rate of the display 150. Specifically, the frame rate conversion part 430 may identify which frame rate a scaled image signal has from the information on the content acquired from the content information database 233, and in case the identified frame rate and the frame rate of the display 150 are different, the frame rate conversion part 430 may convert the identified frame rate to suit the frame rate of the display 150.

After signal processing is completed by the signal processing part 231 as above, a content may be reproduced through the display 150.

The signal processing part 231 includes not only a component for image signal processing as described above, but also further includes a component for audio signal processing, and may thereby perform signal processing for audio fast based on the information on the content acquired in advance.

Meanwhile, according to another embodiment of the disclosure, the information acquisition part 210 may be implemented in another device which is not the receiving device 30, and the receiving device 30 may be provided with information on contents therefrom. For example, the information acquisition part 210 may be implemented in at least one of the first network element 10 or the second network element 20. Alternatively, other than the above, the information acquisition part 210 may be implemented in another device which can communicate with the receiving device 30.

Figure 3:
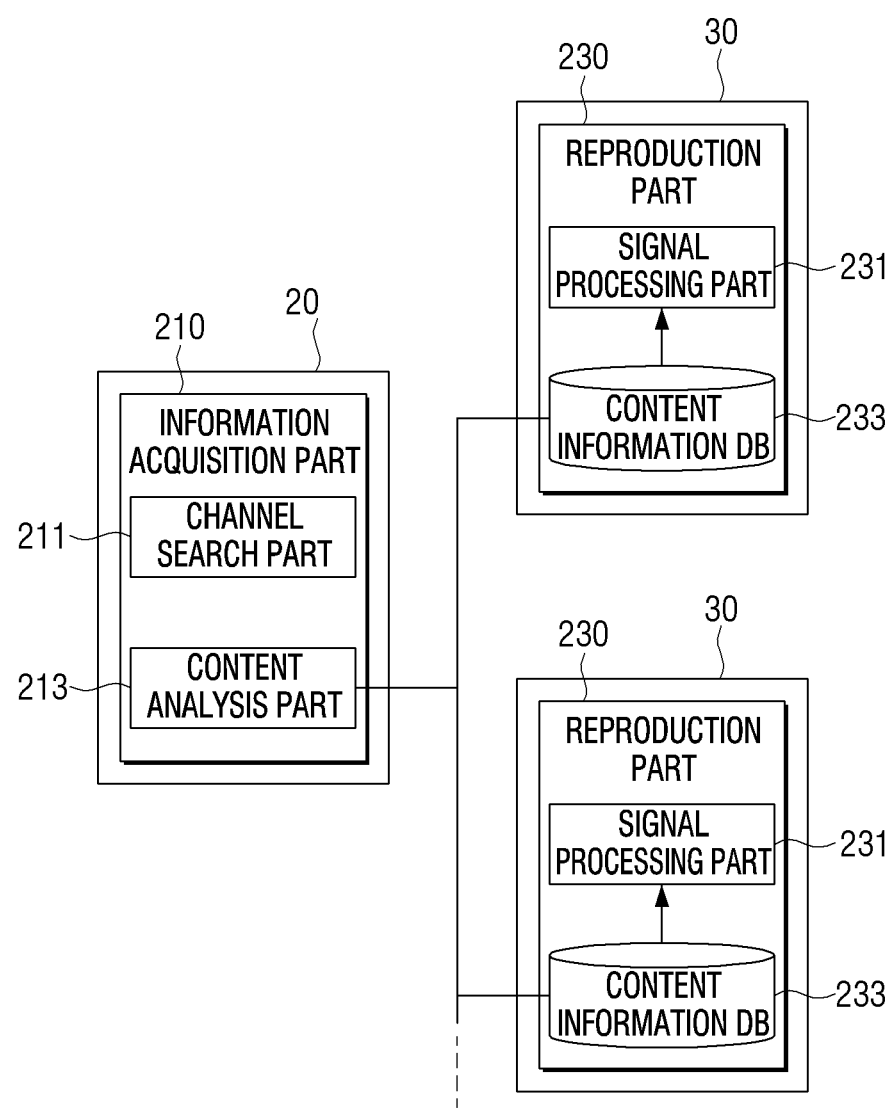
FIG. 3 is a diagram for illustrating an embodiment of the disclosure wherein an information acquisition part is implemented in a second network element of an IPTV system.

FIG. 3 is a diagram for illustrating an embodiment of the disclosure wherein the information acquisition part 210 is implemented in the second network element 20.

Referring to FIG. 3, the second network element 20 may include the information acquisition part 210 including the channel search part 211 and the content analysis part 213, and the receiving device 30 may include the reproduction part 230.

The second network element 20 may perform the operation of the information acquisition part 210 described above with reference to FIG. 2. In particular, in the case of this embodiment, the second network element 20 may not only transmit contents to the receiving device 30, but also transmit information on the contents. As illustrated in FIG. 1, this embodiment may be efficient in an environment wherein there are several receiving devices 30. That is, acquisition of information on contents may be performed in only one device, and the receiving devices 30 that need the information may receive the information on contents.

The receiving device 30 that received information on contents from the second network element 20 may store the information in the content information database 233, and acquire content information corresponding to a changed channel at the time of channel conversion from the content information database 233 and use the information.

Figure 5:
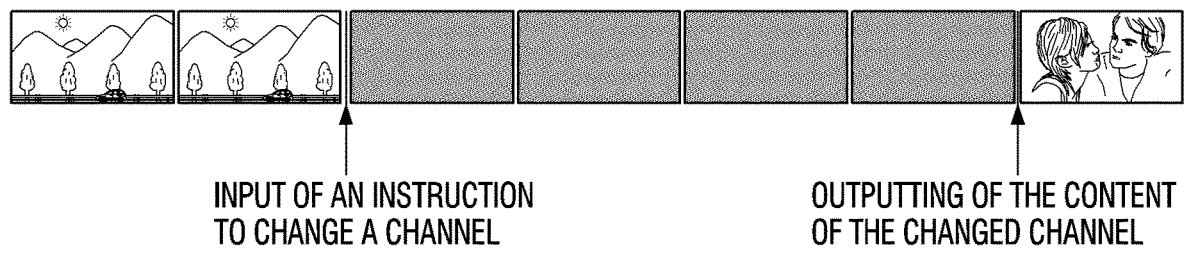
FIG. 5 is a diagram for illustrating in comparison the time for channel change between the conventional method and the method according to an embodiment of the disclosure.
Figure 6:
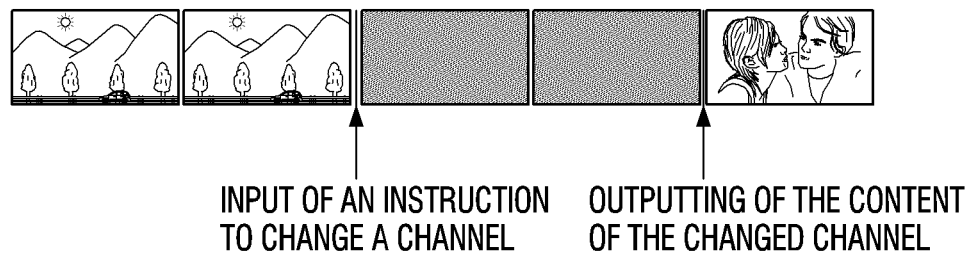
FIG. 6 is a diagram for illustrating in comparison the time for channel change between the conventional method and the method according to an embodiment of the disclosure.

According to the embodiments of the disclosure, information on contents is acquired in advance and signal processing is performed by using the information, and thus a no-sound/no-image period until the content of a changed channel is output from input of an instruction to change a channel may be shortened. FIG. 5 illustrates the periods until the content of a changed channel is displayed in case information on contents is acquired after an instruction to change a channel is input according to a conventional method, and FIG. 6 illustrates the periods until the content of a changed channel is displayed in case information on contents is acquired in advance before an instruction to change a channel is input according to the method of the disclosure. Comparing FIG. 5 and FIG. 6, it can be figured out that in the case of FIG. 6, the black period (a period wherein preparation for reproducing the content of a changed channel is not made, and thus a black screen is displayed) is reduced on the display compared to the case of FIG. 5.

Through the embodiments of the disclosure, a user can obtain an effect of performance conversion of equal to or greater than 1 second at the maximum regardless of whether the user previously viewed a channel at the time of channel conversion. Accordingly, in the case of using an electronic apparatus according to the disclosure for TV viewing, the electronic apparatus can provide fast channel conversion performance that corresponds to RF conversion, and in the case of servicing a promotion image in a signage product, a black period is minimized on a display and an effect of outputting a high quality image can be obtained. Also, as information is continuously updated even in an environment wherein stream information is changed in real time, fast channel conversion performance can be provided stably.

At least one of the information acquisition part 210, the reproduction part 230, the channel search part 211, the content analysis part 213, the signal processing part 231, the decoder 410, the scaler 420, or the frame rate conversion part 430 described in FIGS. 2, 3, and 4 may be manufactured in the form of hardware and mounted on one device, or may be independently mounted on separate devices. Also, at least one of them may be implemented as a software module (or, a program module including instructions). In this case, the software module may be stored in a non-transitory computer readable recording medium. In addition, in this case, the at least one software module may be provided by an operating system (OS), or provided by a specific application. Alternatively, a portion of the at least one software module may be provided by an operating system (OS), and the remaining portion may be provided by a specific application.

Figure 7:
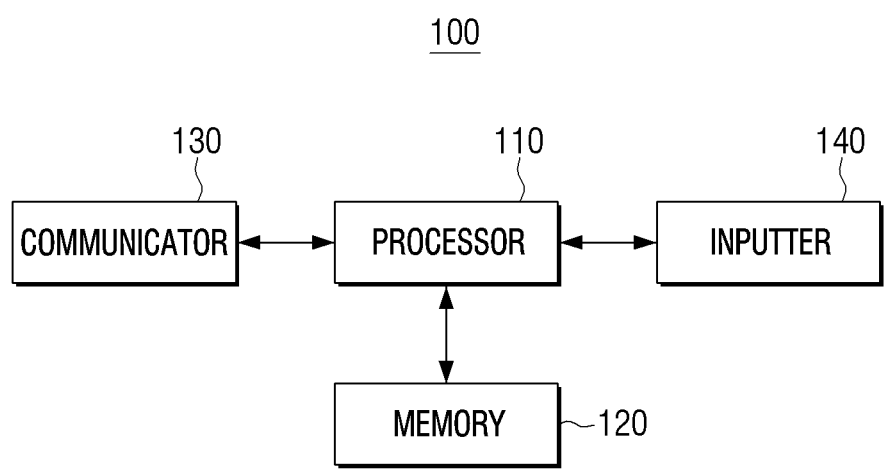
FIG. 7 is a diagram for illustrating a configuration of an electronic apparatus according to an embodiment of the disclosure.

FIG. 7 is a block diagram for illustrating a configuration of an electronic apparatus 100 according to an embodiment of the disclosure.

Referring to FIG. 7, the electronic apparatus 100 may include a processor 110, a memory 120, a communicator 130, and an inputter 140.

The electronic apparatus 100 may be implemented as a set top box, an Over The Top (OTT) device, a TV, etc. For example, the receiving device 30 described with reference to FIGS. 1 to 4 may be the electronic apparatus 100. Alternatively, a combination of the receiving device 30 and the display device 40 may be the electronic apparatus 100.

The processor 110 is a component for controlling the overall operations of the electronic apparatus 100. For example, the processor 110 may operate the operating system and applications and thereby control a plurality of hardware or software components connected to the processor 110, and perform various types of data processing and operations. The processor 110 may be a central processing unit (CPU) or a graphics-processing unit (GPU), or both. Also, the processor 110 may be implemented as at least one general processor, a digital signal processor, an application specific integrated circuit (ASIC), a system on chip (SoC), a microcomputer (MICOM), etc.

The memory 120 may include, for example, a built-in memory and an external memory. The built-in memory may include, for example, at least one of a volatile memory (e.g.: a dynamic RAM (DRAM), a static RAM (SRAM), or a synchronous dynamic RAM (SDRAM), etc.) or a non-volatile memory (e.g.: a one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). The external memory may include a flash drive, for example, compact flash (CF), secure digital (SD), micro secure digital (Micro-SD), mini secure digital (Mini-SD), extreme digital (xD), a multi-media card (MMC), or a memory stick, and the like.

In the memory 120, various data, programs or applications for operating and controlling the electronic apparatus 100 may be stored. A program stored in the memory 120 may include one or more computer executable instructions. The memory 120 may include software and/or firmware constituted as one or more modules. A module may correspond to a collection of instructions. A program (one or more instructions) or an application stored in the memory 120 may be executed by the processor 110.

The communicator 130 may transmit and receive data or signals with an external device by control of the processor 110. For example, the communicator 130 may include one or more components that enable communication through a Local Area Network (LAN), a Wide Area Network (WAN), a Value Added Network (VAN), a mobile radio communication network, a satellite communication network, and a combination thereof. Also, the communicator 130 may transmit and receive data or signals wirelessly with an external device or an external server directly by using a wireless LAN (e.g., Wi-Fi), etc. In addition, the communicator 130 may be implemented as at least one communication chip, a transceiver, a communication port, etc.

The inputter 140 is a component for receiving instructions by user manipulation. The inputter 140 may be implemented as, for example, a touch panel, a touch screen, a button (a physical button, a soft button), a motion sensor, a microphone, a remote control signal receiver, etc.

In the memory 120, at least one of the information acquisition part 210, the reproduction part 230, the channel search part 211, the content analysis part 213, the signal processing part 231, the decoder 410, the scaler 420, or the frame rate conversion part 430 described in FIGS. 2, 3, and 4, which are implemented as software modules, may be stored, and the processor 110 may execute these software modules stored in the memory 120, and thereby perform the operation of at least one of the channel search part 211, the information acquisition part 210, the reproduction part 230, the content analysis part 213, the signal processing part 231, the decoder 410, the scaler 420, or the frame rate conversion part 430 described in FIGS. 2, 3, and 4.

For example, the processor 110 may acquire information on contents of a plurality of other channels in real time in the background while outputting the content of a specific channel received through the communicator 130 connected to a LAN and store the information in the memory 120. As an example, the processor 110 may output the content of a first channel, and receive information on contents of a plurality of channels through the communicator 130 and store the information in the memory 120 while outputting the content of the first channel. Also, if an instruction to change the channel to a second channel is input through the inputter 140 while outputting the content of the first channel, the processor 110 may acquire information on the content of the second channel among the information on the contents of the plurality of channels stored in the memory 120 from the memory 120, and decode the content of the second channel received through the communicator 130 by using the acquired information on the content of the second channel and output the content.

Meanwhile, in the disclosure, the meaning of the outputting of a content by the processor 110 may mean that, in case the electronic apparatus 100 includes an outputting device such as a display/a speaker, etc. by itself, for instance, in case the electronic apparatus 100 is implemented as a TV, the processor 110 outputs an image or outputs a sound corresponding to a content through the outputting device. Meanwhile, in case the electronic apparatus 100 does not include such an outputting device by itself, for instance, in case the electronic apparatus 100 is implemented as a set top box, the meaning of the outputting of a content by the processor 110 may mean that the processor 110 transmits a content to an external outputting device, for example, to a TV, through a wired/wireless communication method.

Meanwhile, the processor 110 may acquire information on contents of a plurality of channels per predetermined cycle and store the information in the memory 120. That is, acquisition of information on contents is not performed just as a one-time event, and a database storing information on contents may be maintained as an up-to-date state through continuous real-time analysis.

Also, the processor 110 may acquire information on an IP:PORT wherein a content is serviced on a LAN network to which the communicator 130 is connected and identify the IP addresses of a plurality of channels, and acquire information on the contents of the plurality of channels based on the identified IP addresses of the plurality of channels.

A content provided to the electronic apparatus 100 may be in the form of a packet including a header and a payload. In this case, the processor 110 may acquire information on the content from information included in the header. For example, information on a content may include at least one of the format information, the frame rate information, or the resolution information of the content. Alternatively, the processor 110 may acquire information on a content included in the metadata of the content.

The processor 110 may load information on the content of a channel corresponding to an instruction to change a channel currently input among the information on the contents of a plurality of channels stored in advance in the memory 120 as above, and perform decoding for the content based on the loaded information, and output the content. For example, information on the content loaded from the memory 120 includes the format information of the content, and the processor 110 may decode the content of the changed channel by a decoding method corresponding to the format information. As another example, information on the content loaded from the memory 120 includes the frame rate information of the content, and the processor 110 may perform frame rate conversion based on the frame rate information. As still another example, information on the content loaded from the memory 120 includes the resolution information of the content, and the processor 110 may perform scaling based on the resolution information.

Meanwhile, according to another embodiment of the disclosure, a function corresponding to the information acquisition part 210 may be provided in an external device, and in this case, the electronic apparatus 100 may be implemented in a form of receiving information on contents of a plurality of channels from the external device through the communicator 130.

Figure 8:
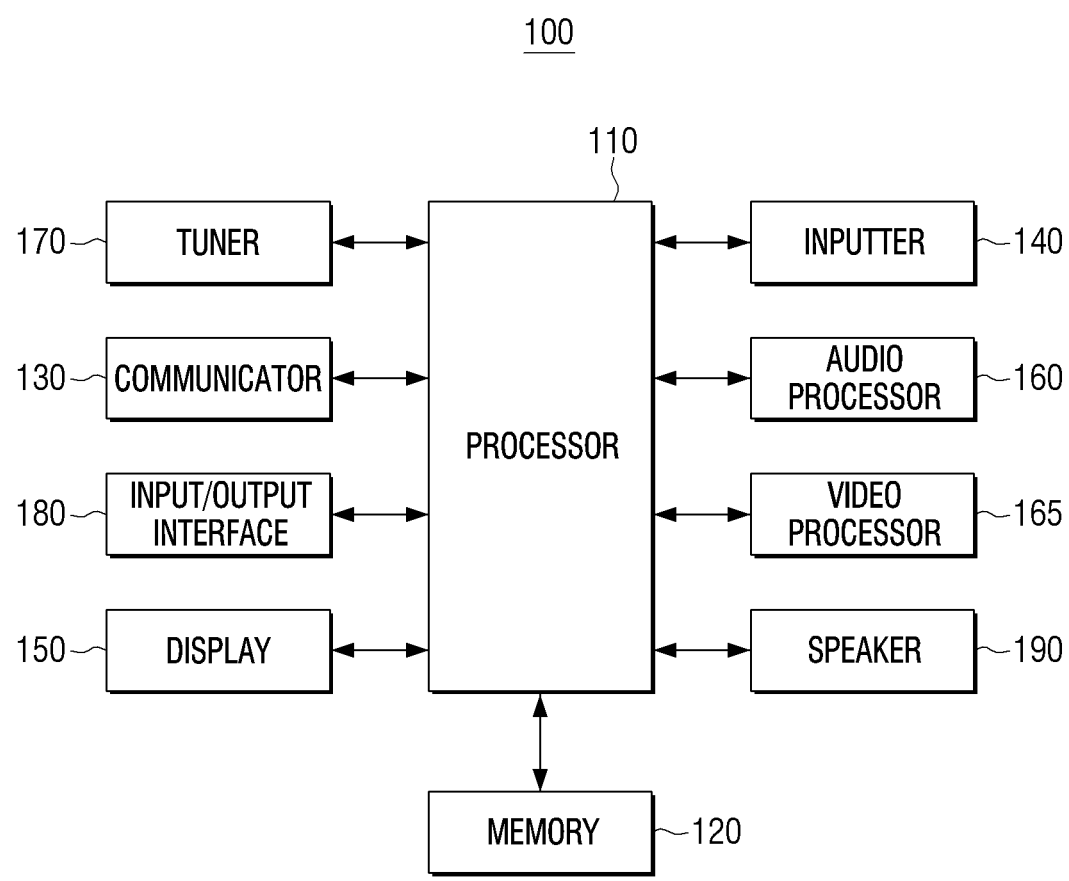
FIG. 8 is a diagram for illustrating a configuration of an electronic apparatus according to another embodiment of the disclosure.

FIG. 8 is a diagram for illustrating the configuration of the electronic apparatus 100 according to another embodiment of the disclosure.

For example, the electronic apparatus 100 may be the receiving device 30 described with reference to FIGS. 1 to 4. As another example, a combination of the receiving device 30 described with reference to FIGS. 1 to 4 and the display device 40 may be the electronic apparatus 100.

The electronic apparatus 100 may include a processor 110, a memory 120, a communicator 130, an inputter 140, a display 150, an audio processor 160, a video processor 165, a tuner 170, and an input/output interface 180. Depending on embodiments, some of the components may be omitted, and although not illustrated, appropriate hardware/software components of an obvious level to those skilled in the art may be additionally included in the electronic apparatus 100.

Meanwhile, as explanation for the processor 110, the memory 120, the communicator 130, and the inputter 140 of the electronic apparatus 100 in FIG. 7 may also be applied in the same manner to the explanation for the electronic apparatus 100 in FIG. 8, overlapping explanation will be omitted.

The electronic apparatus 100 may be implemented as a TV, and for example, it may be implemented as a digital TV, a 3D-TV, a smart TV, an LED TV, an OLED TV, a plasma TV, a monitor, a curved TV having a screen of a fixed curvature, a flexible TV having a screen of a fixed curvature, a bended TV having a screen of a fixed curvature, and/or a curvature-variable TV wherein the curvature of the current screen can be changed by a received user input, etc., but is not limited thereto.

Also, the electronic apparatus 100 may be implemented as a set top box. In this case, the electronic apparatus 100 may not include a display 150 and a speaker 190.

The processor 110 is a component for controlling the overall operations of the electronic apparatus 100. For example, the processor 110 may operate the operating system and applications and thereby control a plurality of hardware or software components connected to the processor 110, and perform various types of data processing operations. Also, the processor 110 may control the memory 120, the communicator 130, the inputter 140, the display 150, the audio processor 160, the video processor 165, the tuner 170, and the input/output interface 180.

The memory 120 may store various data, programs or applications for operating and controlling the electronic apparatus 100. A program stored in the memory 120 may include one or more instructions. A program (one or more instructions) or an application stored in the memory 120 may be executed by the processor 110. Also, the memory 120 may include the aforementioned content information database 233.

The communicator 130 may receive streaming contents based on an Internet protocol. For example, the communicator 130 may receive a live broadcasting content, a VoD content, etc. In particular, the communicator 130 may receive a content transmitted from a UDP environment through a local network. Also, the communicator 130 may receive the content of an IP address corresponding to a channel number corresponding to a user input that was input through the inputter 140.

The tuner 170 may tune and select only the frequency of a channel to be received at the electronic apparatus 100 among numerous electronic wave components through amplification, mixing, resonance, etc. of broadcasting signals received by wire or wirelessly. A broadcasting signal may include video, audio, and additional data (e.g., an Electronic Program Guide (EPG)).

Also, the tuner 170 may receive video, audio, and data in a frequency band corresponding to a channel number corresponding to a user input that was input through the inputter 140.

In addition, the tuner 170 may receive broadcasting signals from various sources such as ground wave broadcasting, cable broadcasting, or satellite broadcasting. Also, the tuner 170 may receive broadcasting signals from sources such as analog broadcasting and digital broadcasting among various sources.

The inputter 140 may receive an instruction corresponding to user manipulation and transmit the instruction to the processor 110. According to an embodiment of the disclosure, the inputter 140 may include various kinds of buttons. According to another embodiment of the disclosure, the inputter 140 may be implemented as a component receiving remote control signals. Also, the inputter 140 may receive remote control signals transmitted by wireless communication methods such as infrared ray (IR), RF, Bluetooth, Wi-Fi, etc. In this case, the inputter 140 may include communicative components such as an infrared ray receiving device, a Wi-Fi chip, a Bluetooth chip, etc. In case the communicator 130 includes such communicative components, the inputter 140 may be replaced by the communicator 130.

In case an instruction to change a channel is input through the inputter 140, the instruction may be transmitted to the processor 110. Then, the processor 110 may control the communicator 130 to receive the content of an IP-based channel corresponding to the instruction to change a channel.

The audio processor 160 is a component performing processing of audio signals. At the audio processor 160, various processing such as decoding or amplification, noise filtering, etc. of audio signals may be performed. The processor 110 may load information on the content of the currently changed channel among the information on contents stored in the memory 120, and control the audio processor 160 to perform processing such as decoding, etc. for the content of the currently changed channel based on the loaded information. Also, the processor 110 may control the speaker 190 to output the processed audio at the audio processor 160.

The speaker 190 is a component for outputting sounds. Meanwhile, the electronic apparatus 100 may include a headphone output terminal.

The video processor 165 is a component performing processing of video signals. At the video processor 165, various processing such as decoding, scaling, noise filtering, frame rate conversion, and resolution conversion for image signals may be performed. The processor 110 may load information on the content of the currently changed channel among the information on contents stored in the memory 120, and control the video processor 165 to perform processing such as decoding, etc. for the content of the currently changed channel based on the loaded information. Also, the processor 110 may control the display 150 to output the video processed at the video processor 165.

The display 150 is a component for outputting images. The display 150 may be implemented as, for example, a liquid crystal display (LCD), a light-emitting diode (LED) display, and an organic light-emitting diode (OLED) display (e.g., an active-matrix organic light-emitting diode (AMOLED) or a passive-matrix OLED (PMOLED)). Alternatively, the display 150 may be implemented as a touch screen.

The input/output interface 180 is a component for being connected with an external device. The input/output interface 180 may include at least one of ports such as a High-Definition Multimedia Interface (HDMI) port, a component input jack, a Universal Serial Bus (USB) port, an RGB port, a Digital Visual Interface (DVI) port, a DisplayPort (DP), a Thunderbolt, etc.

In case the electronic apparatus 100 is implemented as a set top box, it may be connected with an external display device such as a TV through the input/output interface 180. For example, the electronic apparatus 100 and an external display device may be connected through an HDMI cable. In this case, the processor 110 may output a content to the external display device through an HDMI cable.

Figure 9:
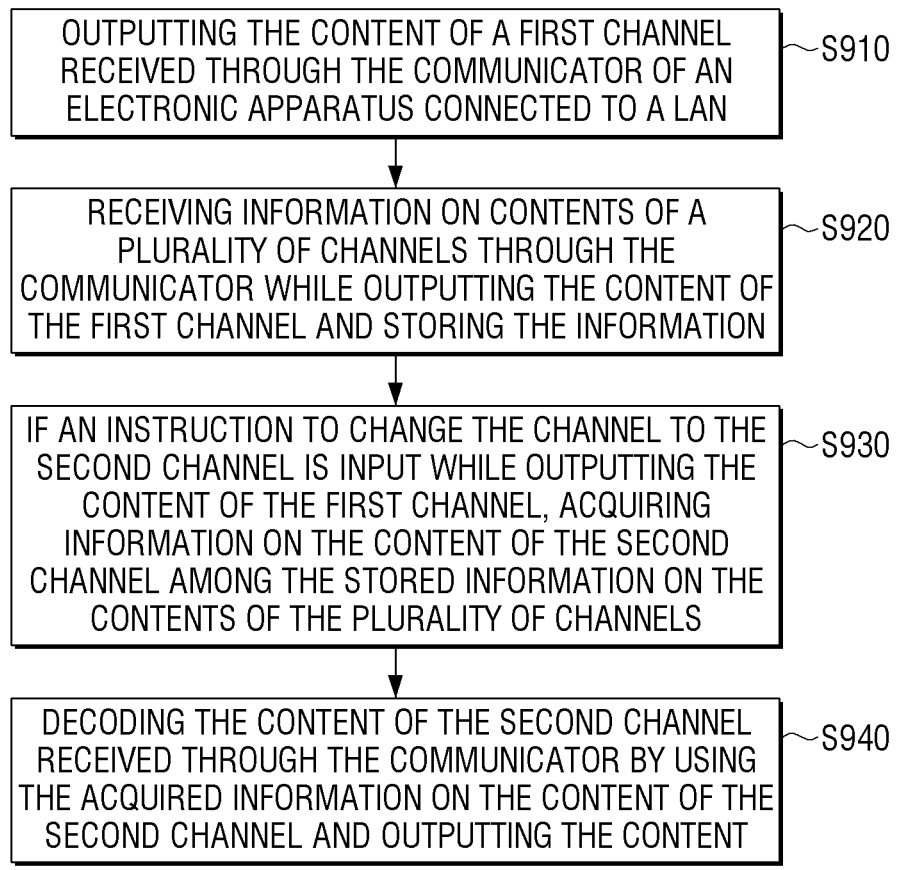
FIG. 9 is a flow chart for illustrating a controlling method of an electronic apparatus according to an embodiment of the disclosure.

FIG. 9 is a flow chart for illustrating a controlling method of an electronic apparatus according to an embodiment of the disclosure. The flow chart illustrated in FIG. 9 may consist of operations processed at the electronic apparatus 100 described in this specification. Accordingly, the contents described with respect to the electronic apparatus 100 may be applied to the flow chart illustrated in FIG. 9, even if they are omitted below.

Referring to FIG. 9, the electronic apparatus may be controlled to perform a step of outputting the content of a first channel received through the communicator of the electronic apparatus connected to a Local Area Network (LAN) at operation S910. Then, the electronic apparatus 100 may be controlled to receive information on contents of a plurality of channels through the communicator and store the information at operation while outputting the content of the first channel S920. That is, the electronic apparatus may be controlled to receive information on contents of other channels while a user is viewing the content of the first channel.

In this case, in order that information on contents can be updated in real time, the electronic apparatus may be controlled to acquire information per predetermined cycle and store the information.

According to an embodiment of the disclosure, the electronic apparatus may be controlled to acquire information on an IP:PORT wherein a content is serviced on a LAN network to which the communicator is connected and identify the IP addresses of the plurality of channels, and acquire information on the contents of the plurality of channels based on the identified IP addresses of the plurality of channels and store the information.

A content that the electronic apparatus receives through a LAN may be in the form of a packet including a header and a payload. For example, a live content in an MPEG-TS (MPEG transport stream (TS)) format may be transmitted to the electronic apparatus through a LAN by a UDP/IP method. In this case, the electronic apparatus may be controlled to identify the header of the MPEG-TS and acquire information on the content. Also, it is possible to acquire information on a content from the metadata of the content. Information on a content may include at least one of the format information of the content, the frame rate information of the content, or the resolution information of the content. Also, the content may be provided to the electronic apparatus by a unicast or multicast method.

Meanwhile, if an instruction to change the channel to a second channel is input while outputting the content of the first channel, the electronic apparatus may be controlled to acquire information on the content of the second channel among the stored information on the contents of the plurality of channels at operation S930.

Also, the electronic apparatus may be controlled to decode the content of the second channel received through the communicator by using the information on the content of the second channel and output the content at operation S940.

In this case, the electronic apparatus may be controlled to decode the content of the second channel by a decoding method corresponding to the format information of the content of the second channel. Also, the electronic apparatus may be controlled to perform frame rate conversion for the decoded content of the second channel based on the frame rate information included in the information on the content and output the content. In addition, the electronic apparatus may be controlled to perform scaling for the decoded content of the second channel based on the resolution information included in the information on the content and output the content.

According to the aforementioned embodiments, when a channel of an IPTV is converted, the speed of channel conversion can become fast to correspond to RF conversion. Also, as information on contents is continuously updated even in an environment wherein stream information is changed in real time, fast channel conversion performance can be provided stably. In addition, there is an advantage that the functions of the disclosure do not need a specific hardware module, but can be processed in terms of software. In particular, in the case of a product which is targeted to several unspecified business operators (ex. hotel TVs, signage), fast channel conversion can be performed by applying the methods in the embodiments of the disclosure without pre-agreement on the protocol in advance. That is, there is an advantage that an effect of performance improvement exists in any environment/configuration, and the universality is high.

The various embodiments of the disclosure described above may be implemented as software, hardware or a combination thereof. According to implementation by hardware, the embodiments described in the disclosure may be implemented by using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions. In particular, the various embodiments described above may be implemented by the processor 110 of the electronic apparatus 100. Meanwhile, according to implementation by software, the embodiments such as procedures and functions described in this specification may be implemented as separate software modules. Each of the software modules may perform one or more functions and operations described in this specification.

Also, the various embodiments of the disclosure may be implemented as software including instructions that can be stored in machine-readable storage media, which can be read by machines (e.g.: computers). The machines refer to apparatuses that call instructions stored in a storage medium, and can operate according to the called instructions, and the apparatuses may include the electronic apparatus 100 according to the embodiments described in the disclosure.

In case an instruction as described above is executed by a processor, the processor may perform a function corresponding to the instruction by itself, or by using other components under its control. An instruction may include a code that is generated or executed by a compiler or an interpreter. For example, as an instruction stored in a storage medium is executed by a processor, the controlling method of an electronic apparatus as described above may be executed. For instance, a controlling method of an electronic apparatus may be performed, which includes the steps of outputting a content of a first channel received through the communicator of the electronic apparatus connected to a Local Area Network (LAN), receiving information on contents of a plurality of channels through the communicator and storing the information while outputting the content of the first channel, and based on an instruction to change the channel to a second channel being input while outputting the content of the first channel, acquiring information on the content of the second channel among the stored information on the contents of the plurality of channels, and decoding the content of the second channel received through the communicator by using the acquired information on the content of the second channel and outputting the content.

A storage medium that is readable by machines may be provided in the form of a non-transitory storage medium. Here, the term 'non-transitory' only means that a storage medium does not include signals, and is tangible, but does not distinguish whether data is stored in the storage medium semi-permanently or temporarily.

Also, according to an embodiment of the disclosure, the method according to the various embodiments described in the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™, App Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the various embodiments (e.g.: a module or a program) may consist of a singular object or a plurality of objects. Also, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
 a communicator connected to a Local Area Network (LAN);
 an inputter;
 a memory storing at least one computer executable instruction; and
 a processor executing the at least one computer executable instruction, wherein the processor is configured to:
  output a content of a first channel received through the communicator,
  identify whether data is being received continuously in a background,
  based on the identification that received data is associated with contents of a plurality of channels, identify IP addresses of the plurality of channels by acquiring information associated with a port where a content is provided on the LAN network;
  receive, information associated with the contents of the plurality of channels transmitted by a multicast method through the communicator continuously in the background based on the identified IP addresses of the plurality of channels, and analyze the received information for channel conversion performance for the plurality of channels and store the analyzed information in the memory while the content of the first channel is being output,
  based on an instruction to a change from the first channel to a second channel among the plurality of channels being input through the inputter while the content of the first channel is being output, acquire the analyzed information associated with content of the second channel among the stored information associated with the contents of the plurality of channels from the memory, and
  decode the content of the second channel received through the communicator by using the acquired analyzed information associated with the content of the second channel and output the decoded content,
  perform frame rate conversion based on a frame rate information for the decoded content of the second channel and perform scaling based on a resolution information for the decoded content of the second channel,
  wherein the information associated with the contents of the plurality of channels comprises format information, frame rate information, and resolution information.

2. The electronic apparatus of claim 1, wherein the processor is configured to:
acquire the analyzed information associated with the contents of the plurality of channels per predetermined cycle and store the information in the memory.

3. The electronic apparatus of claim 1, wherein the contents of the plurality of channels are received through the communicator in a form of a packet including a header and a payload, and
the processor is configured to:
acquire the analyzed information associated with the contents of the plurality of channels from information included in the header.

4. The electronic apparatus of claim 1, wherein the processor is configured to:
decode the content of the second channel by a decoding method corresponding to a format information of the content of the second channel.

5. A controlling method of an electronic apparatus comprising:
outputting a content of a first channel received through the communicator of the electronic apparatus connected to a Local Area Network (LAN);
identifying whether data is being received continuously in a background;
based on the identification that received data is associated with contents of a plurality of channels, identifying IP addresses of the plurality of channels by acquiring information associated with a port where a content is provided on the LAN network;
receiving, format information, frame rate information, and resolution information associated with the contents of the plurality of channels transmitted by a multicast method through the communicator continuously in the background based on the identified IP addresses of the plurality of channels, and analyzing the format information, frame rate information and resolution information for channel conversion performance for the plurality of channels and storing analyzed information while the content of the first channel is being output;
based on an instruction to a change from the first channel to a second channel among the plurality of channels being input while the content of the first channel is being output, acquiring the analyzed information associated with the content of the second channel among the stored information associated with the contents of the plurality of channels; and
decoding the content of the second channel received through the communicator by using the acquired analyzed information associated with the content of the second channel and outputting the decoded content,
performing frame rate conversion based on frame rate information for the decoded content of the second channel and performing scaling based on resolution information for the decoded content of the second channel,
wherein the information associated with contents of the plurality of channels comprises format information, frame rate information, resolution information.

6. The controlling method of claim 5, wherein the storing comprises:
acquiring the analyzed information associated with the contents of the plurality of channels per predetermined cycle and storing the information.

7. The controlling method of claim 5, wherein the contents of the plurality of channels are received through the communicator in a form of a packet including a header and a payload, and
the storing comprises:
acquiring the analyzed information associated with the contents from information included in the header and storing the information.

8. The controlling method of claim 5, wherein the decoding and outputting comprises:
decoding the content of the second channel by a decoding method corresponding to a format information of the content of the second channel.

9. The controlling method of claim 5, the electronic apparatus receives the information associated with the contents of a plurality of channels while information of a service provided is currently being displayed via the electronic apparatus.

* * * * *